June 19, 1962 G. H. VON FUCHS 3,040,250
METHOD AND APPARATUS FOR ANALYZING INSULATION OIL
Filed June 10, 1959
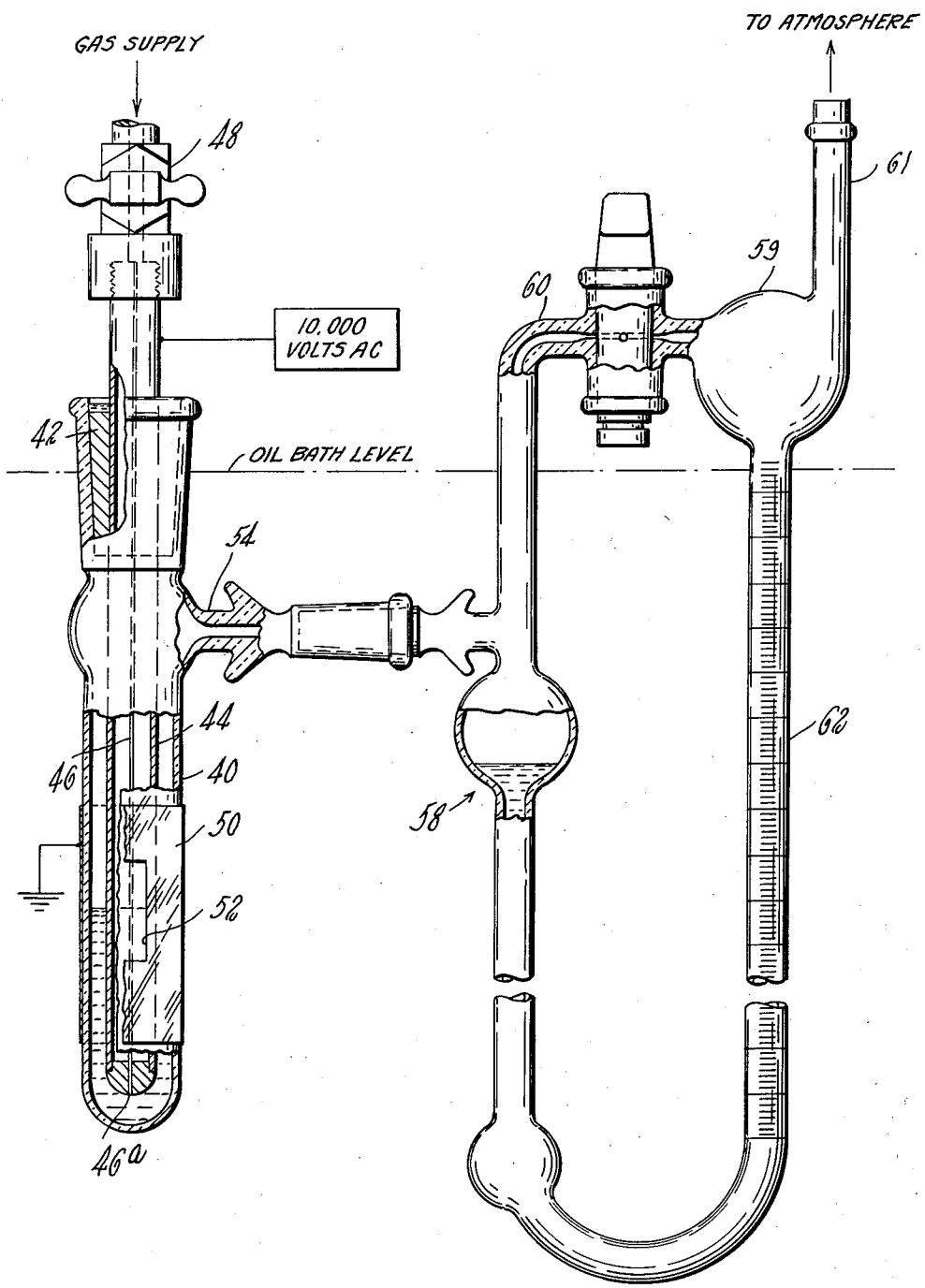

United States Patent Office 3,040,250
Patented June 19, 1962

3,040,250
METHOD AND APPARATUS FOR ANALYZING INSULATION OIL
George H. von Fuchs, Belmont, Mass., assignor to Doble Engineering Company, Belmont, Mass., a corporation of Massachusetts
Filed June 10, 1959, Ser. No. 819,487
13 Claims. (Cl. 324—54)

This invention relates to analyzing oil. More specifically, it relates to a method and apparatus for determining certain qualities of insulation oil used in electric cables, transformers and similar electrical equipment.

It is an object of this invention to provide an improved method and apparatus for more accurately determining whether a given oil is suitable for use as a di-electric. Features of this invention are a method and apparatus to determine whether or not a given oil emits or absorbs hydrogen when subjected to high voltages. Other objects of this invention will, in part, be obvious and will, in part, appear hereinafter.

In the past it has been difficult to evaluate any given oil to determine whether or not it would be suitable for use as a di-electric and coolant in high voltage electrical equipment. It has been determined that the characteristic emission or absorption of hydrogen by the oil when subjected to high voltages is relevant to the evaluation of the oil. Specifically, it has been found that by the method of determining how much hydrogen is emitted by an oil sample under a given high voltage over a definite period there is obtained a direct indication of the quality of the oil, the more hydrogen emitted, the poorer is the oil. Similarly, it has been found, that if by this method the oil absorbs rather than emits hydrogen, the more hydrogen absorbed (chemically bound) the better is the oil for the defined uses.

The hydrogen emission rate of an oil is useful to know because hydrogen gas bubbles formed in insulation in use are the cause of detrimental changes in di-electric properties. If an insulation oil, when subjected to high voltages, emits large quantities of hydrogen, it appears that the oil is subject to early breakdown and hence is not suitable as a di-electric.

It appears further that if an oil absorbs hydrogen when subjected to high voltages, it has a very desirable characteristic for use as a di-electric. Hydrogen generated from the breakdown of some of the oil molecules is thereby absorbed and the di-electric capabilities of the oil are maintained without variance.

In one preferred form the method of the invention comprises placing an amount of oil to be analyzed in the bottom of a chamber, bubbling through this oil an amount of hydrogen so at least to purge the oil and the chamber of all other gases besides oil vapor and hydrogen and to saturate the oil with hydrogen, thereafter sealing the oil in the chamber and a quantity of oil vapor-hydrogen gas phase above the oil from outside communication and subsequently subjecting the gas phase above the oil, and the oil at the gas-liquid interface, to a high voltage for a period and determining whether or not the amount of enclosed gas above the oil has increased or decreased as a result of the application of the high voltage. This determination is accomplished for highly accurate readings using an oil manometer containing oil identical with the sample, and similarly saturated with hydrogen. Alternatively, a preferred method to determine only whether hydrogen is emitted under electrical stress conditions, an essentially inert gas such as nitrogen, helium or argon is similarly bubbled through the oil to remove other gases and then confined with the oil vapor in the gas phase with application of high voltage as above, and for highly accurate readings, using a monometer filled with sample oil.

The apparatus of the invention is more clearly understood by reference to the FIGURE which is a partially cross-sectional, diagrammatic side view of a preferred embodiment of the apparatus of this invention.

Referring now to the figure, there is a gas-tight chamber comprising a vertical glass tube 40 which has in its upper open end a sealing plug 42 of fluorocarbon plastic or the like. Through this plug 42 extends a long electrically conductive hollow metal tube 44 which is centered by the plug so as to be held away from the walls of the glass tube 40 and extends down close to the bottom of the interior of the glass tube. A capillary passage 46 is provided throughout the metal tube 44 with an outlet 46a at the bottom of the metal tube 44. The metal tube is connected through a valve 48 to a gas supply. A substantial circular metal electrode on the outside of the glass tube is formed by metallization with aluminum or silver, for instance, providing an electrical conductive band 50 on that portion of the outside of the glass tube. Electrical means for imposing a high A.C. voltage between the inner metal tube 44 and the metal band 50 is provided. A tube member 54 is joined to the glass tube in a gas-tight manner at a point spaced apart from the bottom of the tube and above the band 50 and has a passage provided therethrough in communication with the interior of the glass tube 40. This passage is connected to an oil manometer 58 including an equalizing valved shunt line 60. A scale 62 is disposed along the atmosphere leg of the manometer. At the upper end of the atmosphere leg, above the scale, there is an enlarged section comprising a receiving chamber 59 with a vent outlet 61, the function of which is hereafter described. The operation of this invention is as follows:

A quantity of oil to be analyzed is poured into the glass tube 40. The level of the oil is maintained substantially above the lower edge of the conductive band 50. For reproducible results and to obtain a reading for comparison with others, the oil level is brought to standard height in the tube by using window 52 in the conductive band 50, accurately defining the amount of oil subjected to the test and the volume of the gas phase above it. Valve 48 and the valved shunt line 60 is opened. Hydrogen is bubbled through the oil at a controlled rate to sweep out unwanted gases from both the apparatus and the oil while at the same time avoiding removal of significant amounts of volatile oil constituents. A steady oil temperature is maintained preferably by immersing the apparatus in a controlled temperature bath to a level indicated in the figure.

For accurate measurements the oil monometer contains the same oil, a sample of which is to be analyzed, which is similarly maintained at the constant temperature. To eliminate spurious effects in the chamber due to the manometer oil, the hydrogen is also bubbled through this oil, saturating it and removing foreign gases. This is accomplished by maintaining the valved shunt line 60 closed after initially permitting gas to be swept out of the chamber through the shunt line. With sufficient gas pressure in the chamber the manometer oil is forced outwards through the legs of the manometer, accumulating in the receiving chamber 59 at the upper end of the atmospheric leg. Hydrogen passes upward through this leg and through this oil, conditioning it. Gas escapes from the receiving chamber through vent line 61, located at one side thereof, out of direct line with the manometer leg connected to the bottom of the chamber. After continued bubbling for a period of at least 15 minutes and as much as an hour, equilibrium conditions are attained, with the oil saturated with hydrogen, and the gas above comprised only of oil vapor and hydrogen. The level of liquid in each side of the manometer is equalized by venting through the valved shunt line. A standard volume is thus defined in the glass tube. A high steady A.C. voltage is then applied between the inner metal tube 44 and the conductive band 50 on the outside of the glass tube. The voltage gradient to which the oil is exposed during a quantitative analysis is preferably about 90 volts/mil in the liquid phase and about 200 volts/mil in the gas phase, simulating extreme service conditions. Where, for instance, the inner diameter of the glass tube is 16 mm. and the outer diameter is 18 mm., and where the outer diameter of the concentrically held metal tube is 10 mm., a voltage in the range of 10,000 volts A.C. is applied between the metal tube 44 and the band 50 on the outside of the glass tube. This voltage is sustained for a standard period, preferably of about 2 hours.

During the application of this voltage, substantial turbulence develops at the surface of the oil and the oil climbs up on both the outside of the metal tube and on the inside wall of the glass vessel. Thus the area of the oil-gas interface is increased, and substantial amounts of the oil enter the gas phase therefrom for reaction. Due to both the high voltage gradient and to intimate mixture with hydrogen therein, a major portion of reaction takes place in the gas phase, although there is reaction at the interface, and to a lesser extent below the surface in the liquid oil.

It is believed that in the gas phase mixture of hydrogen and oil vapors, hydrogen ions are split off from some oil molecules in every instance on application of the high voltage, but in the better oils, unsaturated oil molecules combine with hydrogen ions in the gas phase at a higher rate than they are produced from the oil, and the total effect is that of absorption of hydrogen from the gas phase. As the gas volume varies with temperature, for accurate readings, it is essential to maintain the temperature constant. For highly accurate determinations the temperature is maintainend within 0.1° of a selected constant.

After the application of the voltage, the height of the liquid in the manometer is read at scale 62, indicating whether the amount of hydrogen enclosed has decreased or increased. Thus, it is determined whether or not gas was absorbed or evolved from the oil being analyzed during the application of the voltage.

A preferred variation in the use of the apparatus is possible utilizing inert gas in the determination of the amount of hydrogen evolved from an oil sample over a test period (positive gassing rate) in analyzing those oils which are not hydrogen absorbers. The apparatus is employed exactly as above except that nitrogen, helium, argon, or other essentially non-reactive gas is bubbled through the sample oil and the manometer oil, sweeping out all undesired gas constituents; the gas volume above the oil then sealed off, and a similar voltage is applied under constant temperature conditions. This test is safer to conduct, and is at least equally accurate in determining positive gassing rates.

The apparatus is useful also to determine the threshold voltage at which reaction occurs in the oil. For this purpose the voltage is gradually increased from zero, while observing the gas-liquid interface through a window 52 provided in the metallized coating 50. When turbulence is first noted at the interface, the oil is at its gassing threshold.

To correlate gassing rate with voltage applied it is useful to conduct a number of timed runs at various voltages.

The invention is an improvement over prior known approaches to gassing determination in part in that the sample is saturated with hydrogen or other gases in situ, that is in the same chamber where the voltage is to be applied. Thus no complex valving is required, and it is easier to ensure that the amount of oil tested, from sample to sample, is exactly the same. Similarly, a test oil storage chamber and feed piping is eliminated.

By utilizing a metallized or painted metallic band on the outside of the glass tube, in intimate contact therewith, oil is prevented from being interposed between the outer electrode and the glass tube. Accordingly fouling of the outside of the tube due to the break down of oil on the outer glass surface is prevented.

Also with the apparatus of the instant invention detrimental oil splashing from the receiving chamber during bubbling of the gas through the manometer oil is avoided by locating the vent line out of alignment with the manometer leg.

Because variations of both the method and apparatus can be accomplished under the teachings of the above specification, it is intended that the foregoing material be interpreted in an illustrative and not a limiting sense.

What is claimed is:

1. A method of analyzing an oil which gasses under electrical stress conditions comprising the steps of confining a quantity of oil to be tested and a gas volume at the surface of said oil, subjecting said oil and gas volume to constant temperature conditions, bubbling a gas selected from the group comprised of hydrogen, argon, helium and nitrogen through the oil at a controlled rate and allowing the gas to sweep through said gas volume and escape, thereafter sealing said gas volume from outside communication, imposing a high voltage upon the gas phase in said volume and the oil adjacent the gas-liquid interface for a period and thereafter quantitatively measuring the increase in the amount of gas in said volume thereby determining the positive gassing rate of the oil.

2. The method of claim 1 in which extremely accurate results are obtained, wherein the quantity of gas is measured as required manometrically and at least part of the gas sweeping through said gas volume is passed through fluid of the manometer and then is allowed to escape.

3. A method of analyzing oil comprising the steps of confining a quantity of oil to be tested and a gas volume at the surface of said oil, bubbling hydrogen through the oil and allowing the hydrogen to sweep through said gas volume and escape, thereafter sealing said gas volume from outside communication, imposing a high voltage upon the gas in said volume and the liquid oil for a period and thereafter quantitatively measuring the amount of gas in said volume thereby determining whether or not hydrogen was absorbed or evolved from said oil during the application of said voltage.

4. The method of claim 1 adapted to give accurate quantitative determinations wherein the temperature of said oil and the gas volume thereabove is closely controlled to a constant temperature throughout the test.

5. The method of claim 1 wherein the voltage gradient maintained on the gas phase is about 200 volts/mil and the voltage gradient maintained on the liquid phase is about 90 volts/mil.

6. The method of claim 4 adapted for extremely accurate readings wherein the gas quantity measurements are made with an oil manometer directly in communication with said isolated gas volume, and wherein during said gas bubbling step, at least a portion of said gas is passed through said quantity of oil and said gas volume is successively bubbled through oil of said manometer.

7. In oil analysis a method for obtaining a quantitative reading for comparison to determine the desirability of a given oil as a high voltage insulator comprising introducing a standard volume of the given oil into the bottom of a larger gas-tight container thereby leaving a gas volume above said oil, maintaining a constant temperature of the oil and gas volume thereabove to an accuracy of about 0.1° F., bubbling a gas selected from the group consisting of hydrogen, nitrogen and essentially inert gases through the oil and allowing it to sweep the gas volume thereabove for a period of at least 15 minutes, and thereafter isolating the gas-tight container from outside communication, subjecting the gas in said gas volume above the oil to an alternating electrical potential gradient of about 200 volts/mil and the oil to a gradient of about 90 volts/mil for a standard time period of about 2 hours and thereafter measuring the resultant amount of gas in said gas volume.

8. An apparatus for analyzing oil comprising a vertical laboratory-glass chamber, a metal conductive band surrounding a portion of said chamber, a sealable opening for introducing oil into said chamber to a standard level above the lower edge of said metal band, a hollow electrically conductive tube extending vertically inside said chamber and concentrically therewith to a point close to the bottom thereof below said standard level, the outer surface of said tube at said level being uninsulated, said tube being thereby adapted to impose electrical stress on said oil, and adapted to receive gas from a gas supply and conduct it into the bottom of said chamber, a valve means for sealing off said gas means, a manometer means connected to the upper portion of said glass chamber, a valved shunt line connected to the upper part of said glass chamber permitting direct communication between the chamber volume and the outside, and means for applying a high A.-C. voltage between said metal band and said hollow, electrically conductive tube.

9. The apparatus of claim 8 wherein a constant temperature bath is provided and said chamber is immersed in said constant temperature bath.

10. A central electrode in combination with a gassing tendency test cell adapted for connection to a pressure measuring means, said cell having an annular electrode means surrounding an oil containable zone in said cell and a gas containable zone thereabove, said cell having a mouth in communication with said zones through which said central electrode extends, said central electrode comprising an electrically conductive tube, a sealing and centering plug mounted on and surrounding an upper portion of said tube, and having a complementary shape with said mouth of said test cell, to rest therein, suspending the lower portion of said tube through said gas containable zone into said oil containable zone generally concentrically within said annular electrode means of said test cell, the outer surface of an elongated portion of said tube extending between said zones being uninsulated, a portion of said tube extending above said plug providing an electrical contact for energization, a capillary passage extending longitudinally inside said tube with its outlet at the bottom thereof, and its inlet at an upper tube portion, above said plug, adapted to be connected to a gas supply.

11. A gassing tendency test assembly comprised of a test cell elongated chamber of a diameter of about 16 mm. having a standard level up to which said chamber can be filled with oil, said cell adapted for connection to a pressure-measuring means, an annular electrode around said chamber, and an elongated conductive metal member of a diameter on the order of 10 mm. having an interior axially extending gas passage in said member, at least one end of said member being adapted to be engaged for vertically supporting said member into said chamber and to extend outside thereof, a gas passage fitting member secured to an outside end of said member, adapted to connect said gas passage to a gas supply, and an electrical connection on an outside end of said metal member adapted to be connected to a power source for energization, said metal member having an elongated uninsulated portion extending vertically in both directions from said standard level, said gas passage having an outlet in said metal member portion positioned below said level, the thus defined electrode being held vertically in said elongated chamber, and concentric within said annular electrode the latter adapted to be energized at a substantially different electrical potential, the electrode assembly being thereby adapted to the combined purposes of introducing into said chamber gas for pretreatment of oil, applying an electrical stress upon said oil sample and space thereabove, and providing upright surfaces extending from said sample into the space thereabove upon which oil under stress can climb, substantially increasing the liquid-gas interface.

12. An apparatus for analyzing oil comprising a tubular, nonconductive chamber having a bottom portion adapted to receive and contain a quantity of oil and having an upper portion adapted to define a gas volume immediately above said oil, a band of conductive material in intimate contact with and disposed around a portion of the outer surface of said chamber, about the interface between said two portions, an elongated metal tube suspended into said vertical chamber substantially centrally thereof, the lower end of said metal tube being submerged below the surface of the oil at said interface, the outer surface of said metal tube at said interface being uninsulated, an elongated gas passage extending through said metal tube adapted to conduct gas from outside into the oil from the lower portion of said metal tube, an outlet means in said chamber above said surface of said oil for outward passage of gas from said chamber, adapted to allow gas introduced through said tube to sweep the chamber and escape, means in communication with said outlet for sealing said outlet against movement of gas and for measuring change in the pressure of gas trapped within said chamber, and means for imposing a high voltage between said inner metal tube and said outer electrically conductive band.

13. The apparatus of claim 12, wherein said measuring means comprises a liquid manometer having one leg in direct communication with said gas in said chamber and the second leg in communication with a gas receiving zone, and said means spaced from the bottom of said chamber for allowing gas to sweep the chamber and escape and for isolating the chamber in a gas-tight relationship includes a receiving chamber provided in the second leg of said manometer whereby said manometer liquid can be subjected to gas bubbling during bubbling of gas through a sample in said chamber.

References Cited in the file of this patent

UNITED STATES PATENTS

| | | |
|---|---|---|
| 862,092 | Morehead | July 30, 1907 |
| 1,056,045 | Murray | Mar. 18, 1913 |
| 1,702,950 | Ruben | Feb. 19, 1929 |
| 2,271,895 | Hartman | Feb. 3, 1942 |
| 2,860,094 | Ishizuka | Nov. 11, 1958 |

OTHER REFERENCES

Beaver et al.: Journal of Institute of Petroleum, vol. 35, No. 311, November 1949; pages 735–754.